United States Patent
Sorrentino et al.

(10) Patent No.: US 10,355,884 B2
(45) Date of Patent: Jul. 16, 2019

(54) ROBUST CHANNEL ESTIMATION FOR VEHICULAR APPLICATIONS

(71) Applicant: Telefonaktiebolaget LM Ericsson (publ), Stockholm (SE)

(72) Inventors: Stefano Sorrentino, Solna (SE); Ricardo Blasco Serrano, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/769,857

(22) PCT Filed: Oct. 28, 2016

(86) PCT No.: PCT/SE2016/051055
§ 371 (c)(1),
(2) Date: Apr. 20, 2018

(87) PCT Pub. No.: WO2017/078594
PCT Pub. Date: May 11, 2017

(65) Prior Publication Data
US 2018/0294996 A1  Oct. 11, 2018

Related U.S. Application Data

(60) Provisional application No. 62/251,326, filed on Nov. 5, 2015.

(51) Int. Cl.
*H04L 27/00* (2006.01)
*H04L 7/06* (2006.01)
(Continued)

(52) U.S. Cl.
CPC ............ *H04L 25/022* (2013.01); *H04B 1/10* (2013.01); *H04B 1/1027* (2013.01); *H04L 7/00* (2013.01);
(Continued)

(58) Field of Classification Search
CPC combination set(s) only.
See application file for complete search history.

(56) References Cited

U.S. PATENT DOCUMENTS 7,570,722 B1 * 8/2009 Lee .......................... H04B 7/01
375/316
7,639,750 B2 * 12/2009 Chen ................... H04L 27/2695
375/260

(Continued)

FOREIGN PATENT DOCUMENTS

WO      02 45333 A1    6/2002

OTHER PUBLICATIONS

PCT International Search Report for International application No. PCT/SE2016/051055—dated Jan. 25, 2017.

(Continued)

*Primary Examiner* — Linda Wong
(74) *Attorney, Agent, or Firm* — Patent Portfolio Builders, PLLC

(57) ABSTRACT

A method in a receiver node (110, 115) is disclosed. The method comprises converting (604) a received time-domain signal (305, 405) to a frequency-domain signal, and obtaining (608), for the frequency-domain signal, an estimate of a frequency offset between a particular transmitter of one or more transmitters of interest and a receiver of the receiver node. The method comprises obtaining (612) a frequency compensated signal by applying a first frequency offset to compensate for the estimated frequency offset, and obtaining (616) a first channel estimation from the frequency compensated signal. The method comprises obtaining (620) a second channel estimation from the first channel estimation by applying a second frequency offset to the estimated channel, wherein the second frequency offset is the opposite of the first frequency offset.

22 Claims, 11 Drawing Sheets

(51) Int. Cl.
  *H04L 7/00* (2006.01)
  *H04B 1/10* (2006.01)
  *H04L 25/02* (2006.01)
  *H04L 27/26* (2006.01)

(52) U.S. Cl.
  CPC .......... *H04L 7/0016* (2013.01); *H04L 7/06* (2013.01); *H04L 25/0204* (2013.01); *H04L 27/0014* (2013.01); *H04L 27/2657* (2013.01); *H04L 27/2695* (2013.01); *H04L 2027/0026* (2013.01)

(56) References Cited

U.S. PATENT DOCUMENTS

| | | | | |
|---|---|---|---|---|
| 8,483,338 | B2* | 7/2013 | Panicker | H04L 5/0007 375/346 |
| 8,761,319 | B2* | 6/2014 | Shirakata | H04L 27/0014 375/295 |
| 8,774,034 | B2* | 7/2014 | Li | H04L 27/2695 370/252 |
| 9,031,180 | B2* | 5/2015 | Rahul | H04L 27/2691 375/356 |
| 2003/0072397 | A1* | 4/2003 | Kim | H04B 7/0848 375/347 |
| 2004/0180635 | A1* | 9/2004 | Choi | H03D 3/007 455/113 |
| 2006/0269003 | A1* | 11/2006 | Hammerschmidt | H04L 25/06 375/260 |
| 2007/0047671 | A1* | 3/2007 | Chen | H04L 25/0204 375/326 |
| 2008/0095250 | A1* | 4/2008 | Kim | H04L 27/266 375/260 |
| 2009/0003493 | A1* | 1/2009 | Gunturi | H04L 27/2657 375/344 |
| 2009/0175367 | A1* | 7/2009 | Kishigami | H04B 7/084 375/260 |
| 2009/0323515 | A1* | 12/2009 | Ishikura | H04L 5/0007 370/210 |
| 2010/0080112 | A1 | 4/2010 | Bertrand et al. | |
| 2011/0286559 | A1* | 11/2011 | Peng | H04L 25/022 375/346 |
| 2013/0170590 | A1 | 7/2013 | Hyll et al. | |
| 2014/0112377 | A1* | 4/2014 | Chiu | H04B 7/0894 375/219 |
| 2014/0205045 | A1* | 7/2014 | Cai | H04B 1/1027 375/347 |
| 2016/0099824 | A1* | 4/2016 | Lorca Hernando | H04L 5/0007 370/330 |

OTHER PUBLICATIONS

Time and Frequency Synchronization of a Wireless Sensor Network With Signals of Opportunity by Hans Martin Troger et al.; Institute of Information Technology, Erlangen, Germany—2014.
PCT Written Opinion of the International Searching Authority for International application No. PCT/SE2016/051055—dated Jan. 25, 2017.

* cited by examiner

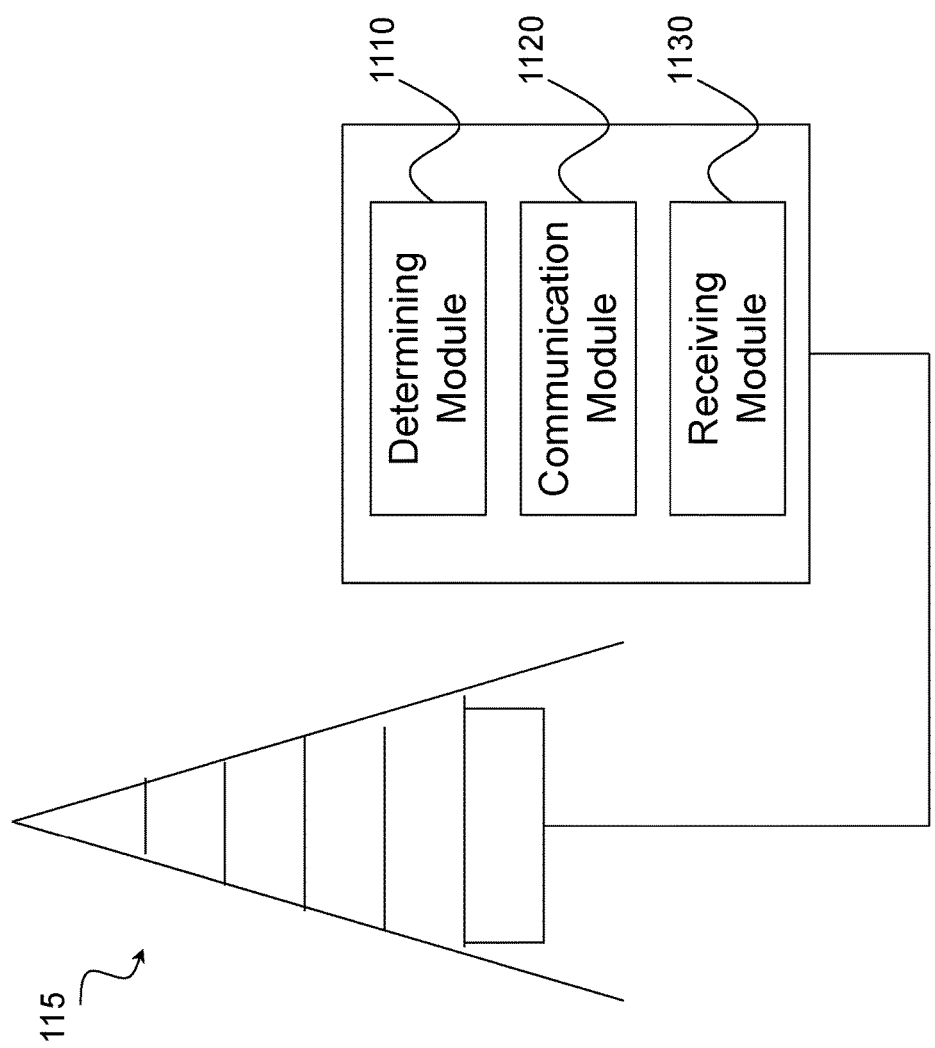

ROBUST CHANNEL ESTIMATION FOR VEHICULAR APPLICATIONS

PRIORITY

This nonprovisional application is a U.S. National Stage Filing under 35 U.S.C. § 371 of International Patent Application Serial No. PCT/SE2016/051055 filed Oct. 28, 2016, and entitled "ROBUST CHANNEL ESTIMATION FOR VEHICULAR APPLICATIONS" which claims priority to U.S. Provisional Patent Application No. 62/251,326 filed Nov. 5, 2015, both of which are hereby incorporated by reference in their entirety.

TECHNICAL FIELD

The present disclosure relates, in general, to wireless communications and, more particularly, to robust channel estimation for vehicular applications.

BACKGROUND

During Release 12, the Long Term Evolution (LTE) standard has been extended with support of device-to-device (D2D) (specified as "sidelink") features targeting both commercial and public safety applications. An example application enabled by Release 12 LTE is device discovery, where devices are able to sense the proximity of another device and associated application by broadcasting and detecting discovery messages that carry device and application identities. Another example application enabled by Release 12 LTE is direct communication based on physical channels terminated directly between devices.

One of the potential extensions for D2D is support of vehicle-to-anything-you-can-imagine (V2x) communication. V2x communication includes any combination of direct communication between vehicles, pedestrians and infrastructure. V2x communication may take advantage of a network infrastructure, when available, but at least basic V2x connectivity should be possible even in case of lack of coverage. Providing an LTE-based V2x interface may be economically advantageous because of the LTE economies of scale, and it may enable tighter integration between communications with the network infrastructure (V2I), vehicle-to-pedestrian (V2P) communications, and vehicle-to-vehicle (V2V) communications, as compared to using a dedicated V2x technology.

V2x communications may carry both non-safety and safety information, where each of the applications and services may be associated with a specific set of requirements (e.g., in terms of latency, reliability, capacity, etc.). For example, the European Telecommunications Standards Institute (ETSI) has defined two types of messages for road safety: the Cooperative Awareness Message (CAM) and the Decentralized Environmental Notification Message (DENM).

The CAM message is intended to enable vehicles, including emergency vehicles, to notify their presence and other relevant parameters in a broadcast fashion. These messages target other vehicles, pedestrians, and infrastructure, and are handled by their applications. CAM messages also serve as active assistance to safety driving for normal traffic. The availability of a CAM message is indicatively checked for every 100 ms, yielding a maximum detection latency requirement of less than or equal to 100 ms for most messages. The latency requirement for a pre-crash sensing warning, however, is 50 ms.

The DENM message is event-triggered, such as by braking. The availability of a DENM message is also checked for every 100 ms. The requirement of maximum latency is less than or equal to 100 ms.

The package size of CAM and DENM messages varies from 100+ to 800+ bytes, and the typical size is around 300 bytes. The message is supposed to be detected by all vehicles in proximity.

The Society of the Automotive Engineers (SAE) has also defined the Basic Safety Message (BSM) for Dedicated Short Range Communications (DSRC), with various message sizes defined. According to the importance and urgency of the messages, BSMs are further classified into different priorities.

The 3rd Generation Partnership Project (3GPP) is discussing enhancements to the LTE physical layer in order to improve the efficiency of V2x communication. This includes communications between devices (e.g., vehicles) as well as communications between devices and the network infrastructure (e.g., roadside units). The evolution of the sidelink physical layer format is considered by 3GPP as the starting point for such enhancements. One of the key enhancement areas is the design of demodulation reference signal (DMRS) to allow low error probability when detecting signals transmitted by devices in high mobility. One of the prioritized deployment scenarios assumes a carrier frequency around 6 GHz.

The sidelink physical layer format was designed assuming lower carrier frequency and lower relative mobility between nodes, which results in lower Doppler spread between nodes. One of the approaches currently studied by RAN1 for coping with increased Doppler spread consists of densifying the time-density of the DMRS pattern in each subframe, which reduces the need to interpolate/extrapolate channel samples between DMRS transmission instances.

SUMMARY

To address problems with existing approaches, disclosed is a method in a receiver node. The method comprises converting a received time-domain signal to a frequency-domain signal. The method comprises obtaining, for the frequency-domain signal, an estimate of a frequency offset between a particular transmitter of one or more transmitters of interest and a receiver of the receiver node. The method comprises obtaining a frequency compensated signal by applying a first frequency offset to compensate for the estimated frequency offset, and obtaining a first channel estimation from the frequency compensated signal. The method comprises obtaining a second channel estimation from the first channel estimation by applying a second frequency offset to the estimated channel, wherein the second frequency offset is the opposite of the first frequency offset.

In certain embodiments, the method may comprise equalizing the frequency-domain signal using the second channel estimation. The method may comprise detecting data transmitted to the receiver node using the equalized frequency-domain signal. The receiver node may comprise one of a network node and a wireless device. The received time-domain signal may comprise a device-to-device communication. The received time-domain signal may be converted to a frequency-domain signal using a discrete Fourier transform.

In certain embodiments, obtaining the estimate of the frequency offset between the particular transmitter and the receiver of the receiver node may comprise calculating an estimate of the frequency offset with respect to a signal to which the particular transmitter is synchronized.

In certain embodiments, the frequency compensated signal may be obtained for at least a fraction of a signal bandwidth used by the particular transmitter. In certain embodiments, obtaining the frequency compensated signal by applying the first frequency offset to compensate for the estimated frequency offset may comprise applying the first frequency offset to the frequency-domain signal to obtain the frequency compensated signal. In certain embodiments, the frequency compensated signal may comprise a frequency compensated pilot signal, and obtaining the frequency compensated signal by applying the first frequency offset to compensate for the estimated frequency offset may comprise applying the first frequency offset to a pilot signal to obtain the frequency compensated pilot signal. In certain embodiments, obtaining the first channel estimation from the frequency compensated signal may comprise obtaining the first channel estimation from the frequency compensated pilot signal.

In certain embodiments, the first channel estimation may be obtained for at least one or more subcarriers and symbols used by the particular transmitter for transmission to the receiver node.

According to another example embodiment, a receiver node is disclosed. The receiver node comprises a receiver and one or more processors coupled to the receiver. The one or more processors are configured to convert a received time-domain signal to a frequency-domain signal. The one or more processors are configured to obtain, for the frequency-domain signal, an estimate of a frequency offset between a particular transmitter of one or more transmitters of interest and a receiver of the receiver node. The one or more processors are configured to obtain a frequency compensated signal by applying a first frequency offset to compensate for the estimated frequency offset. The one or more processors are configured to obtain a first channel estimation from the frequency compensated signal, and obtain a second channel estimation from the first channel estimation by applying a second frequency offset to the estimated channel, wherein the second frequency offset is the opposite of the first frequency offset.

Certain embodiments of the present disclosure may provide one or more technical advantages. As one example, in certain embodiments a channel estimator algorithm is disclosed that may advantageously improve performance compared to a conventional channel estimation algorithm based on time-domain interpolation and extrapolation. As another example, certain embodiments may provide increased link and system performance, as well as a reduced need for DMRS densification, which in turn benefits signaling overhead. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 11 is a block schematic of an exemplary network node, in accordance with certain embodiments.

DETAILED DESCRIPTION

Figure 1:
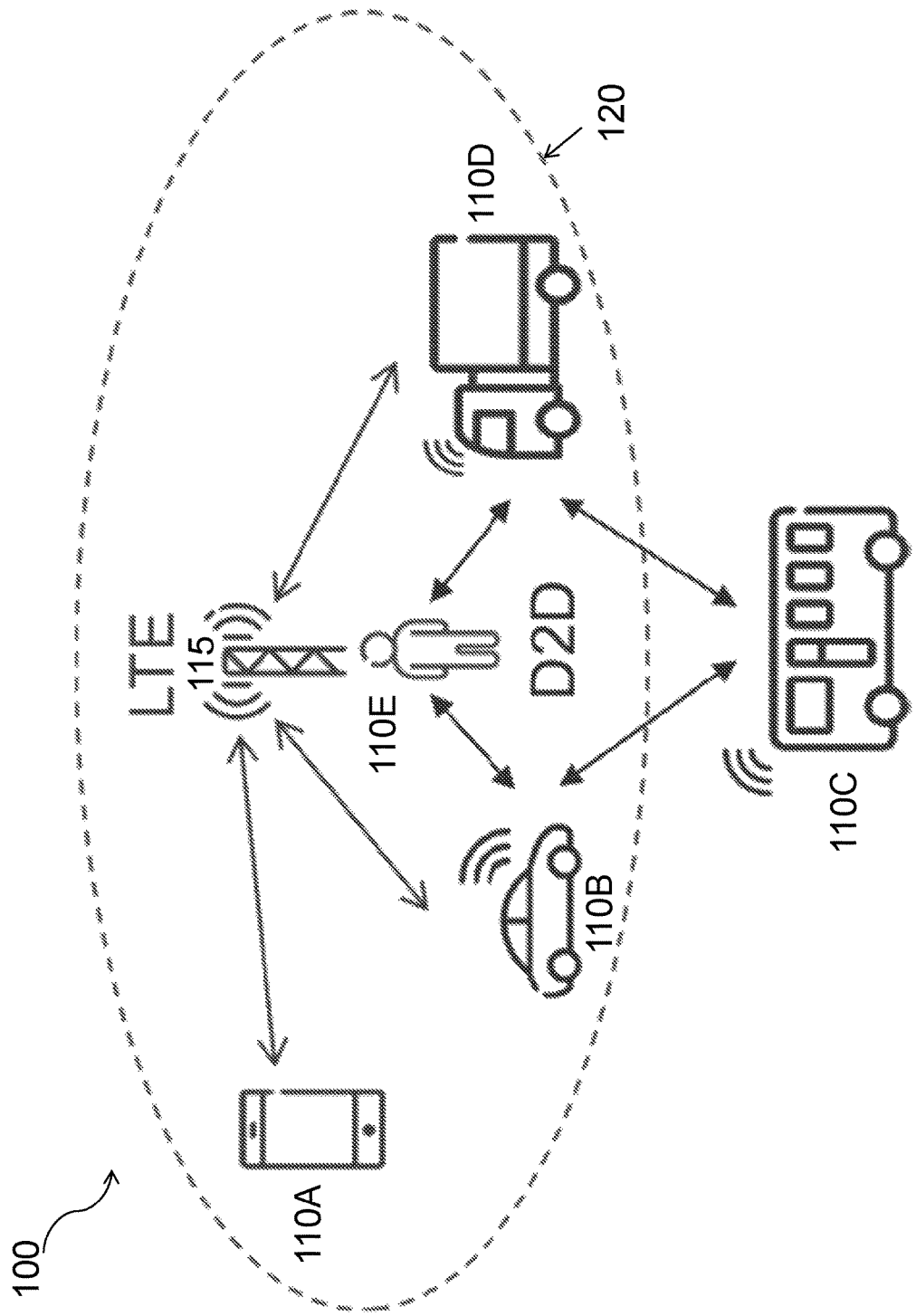
FIG. 1 illustrates an embodiment of a wireless communications network, in accordance with certain embodiments.

As described above, the sidelink physical layer format was designed assuming lower carrier frequency and lower relative mobility (and therefore lower Doppler) between nodes. At least in some instances, V2x communication may be characterized by devices in high mobility, and therefore increased Doppler. One approach to improve channel estimation performance in case of high Doppler is densifying the DMRS pattern in time. There is a practical limit to such densification, however, because the relative overhead due to transmission of reference signals increases accordingly. Even doubling the sidelink DMRS overhead from 2 to 4 DMRS per subframe does not enable sufficiently reliable demodulation for certain packet sizes and high Doppler. Furthermore, DMRS densification is generally not suitable due to the excessive overhead.

The present disclosure contemplates various embodiments that may address these and other deficiencies associated with existing approaches. In certain embodiments, this is achieved using new channel estimation algorithms in which the effect of linear Doppler shift is explicitly modeled and compensated for in the frequency domain, independently for each link (i.e., for each transmitter).

According to one example embodiment, a method in a receiver node is disclosed. The receiver node may, for example, be a wireless device (e.g., a user equipment (UE)) or a network node (e.g., an eNB or a Roadside Unit (RSU)). The receiver node converts a received time-domain signal to a frequency-domain signal. The receiver node obtains, for the frequency-domain signal, an estimate of a frequency offset between a particular transmitter of one or more transmitters of interest and a receiver of the receiver node. The receiver node obtains a frequency compensated signal by applying a first frequency offset to compensate for the estimated frequency offset, and obtains a first channel estimation from the frequency compensated signal. The receiver node obtains a second channel estimation from the first channel estimation by applying a second frequency offset to the estimated channel. The second frequency offset is the opposite of the first frequency offset. In certain embodiments, the receiver node may equalize the frequency-domain signal using the second channel estimation, and detect data transmitted to the receiver node using the equalized frequency domain signal. In some cases, these operations can be combined with other functional blocks in a channel estimator, such as time-domain generic frequency offset compensation, channel interpolation across subcarriers, channel extrapolation, channel filtering in frequency domain, or any other suitable functional block.

Certain embodiments of the present disclosure may provide one or more technical advantages. As one example, in certain embodiments a channel estimator algorithm is disclosed that may advantageously improve performance compared to a conventional channel estimation algorithm based on time-domain interpolation and extrapolation. As another example, certain embodiments may provide increased link and system performance, as well as a reduced need for DMRS densification, which in turn benefits signaling overhead. Other advantages may be readily apparent to one having skill in the art. Certain embodiments may have none, some, or all of the recited advantages.

FIG. 1 illustrates an embodiment of a wireless communications network 100, in accordance with certain embodiments. Network 100 includes one or more wireless device(s) 110 (which may be interchangeably referred to as UEs 110) and network node(s) 115 (which may be interchangeably referred to as eNBs 115). More particularly, wireless device 110A is a smart phone, wireless devices 110B-D are vehicles, and wireless device 110E is a pedestrian having a wireless device 110, such as, for example, a smart phone. Wireless devices 110 may communicate with a network node 115, or with one or more other wireless devices 110 over a wireless interface. For example, wireless device 110A, 110B, and 110D may transmit wireless signals to network node 115 and/or receive wireless signals from network node 115. Wireless devices 110 may also transmit wireless signals to other wireless devices 110 and/or receive wireless signals from other wireless devices 110. For example, wireless devices 110B, 110C, 110D, and 110E may communicate using D2D communication. The wireless signals may contain voice traffic, data traffic, control signals, and/or any other suitable information. In some embodiments, an area of wireless signal coverage associated with network node 115 may be referred to as a cell 120.

In certain embodiments, network node 115 may interface with a radio network controller. The radio network controller may control network node 115 and may provide certain radio resource management functions, mobility management functions, and/or other suitable functions. In some cases, the functionality of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless device 110. Wireless device 110 may exchange certain signals with the core network node using the non-access stratum layer. In non-access stratum signaling, signals between wireless device 110 and the core network node may be transparently passed through the radio access network. In certain embodiments, network node 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term "wireless device" or "UE" is used. Wireless devices 110 described herein can be any type of wireless device capable of communicating with network node(s) 115 or another wireless device over radio signals. Wireless device 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. Wireless device 110 may operate under either normal coverage or enhanced coverage with respect to its serving cell. The enhanced coverage may be interchangeably referred to as extended coverage. Wireless device 110 may also operate in a plurality of coverage levels (e.g., normal coverage, enhanced coverage level 1, enhanced coverage level 2, enhanced coverage level 3 and so on). In some cases, wireless device 110 may also operate in out-of-coverage scenarios.

Also, in some embodiments generic terminology, "network node" is used. It can be any kind of network node, which may comprise a roadside unit, base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and wireless device should be considered non-limiting and does in particular not imply a certain hierarchical relation between the two; in general "eNodeB" could be considered as device 1 and "wireless device" device 2, and these two devices communicate with each other over some radio channel.

Example embodiments of wireless device 110, network node 115, and other network nodes (such as radio network controller or core network node) are described in more detail with respect to FIGS. 7-11 described below.

As described above, V2x communication may include any combination of direct communication between vehicles, pedestrians, and infrastructure. FIG. 1 illustrates a variety of V2x scenarios in which the various embodiments of the present disclosure may be applied. As an example of V2I communication, wireless device 110A, 110B, and 110D may communicate wirelessly with network node 115 (which may, for example, be a roadside unit). As an example of V2P communication, wireless devices 110B and 110D may communicate with a pedestrian having a wireless device 110E. As an example of V2V communication, wireless devices 110B, 110C, and 110D may communicate wirelessly with each other. Although certain embodiments may be described in the context of V2x applications, the various embodiments may be applied to other applications.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described in the context of LTE networks, the present disclosure contemplates that the various embodiments may be applied to LTE evolution or to any other wireless systems. The various embodiments described herein may be implemented in any appropriate type of telecommunication system supporting any suitable communication standards (including 5G standards) and using any suitable components, and are applicable to any radio access technology (RAT) or multi-RAT systems in which the wireless device receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies.

Although the various embodiments may be described in the context of D2D (which may be interchangeably referred to as sidelink, peer-to-peer, or ProSe) and particularly V2V, they can be applied to communication among any types of nodes. Moreover, the various embodiments may be implemented in a wireless device as well as in an infrastructure node (e.g., network node 115 in the form of, for example, an eNB or roadside unit).

Mobility between a transmitter (e.g., network node 115) and a receiver node (e.g., wireless device 110B) induces variations in the radio channel that occur with a frequency proportional to the carrier frequency (i.e., the frequency at which the modulated communication occurs) as well as to the speeds of the transmitter and receiver nodes. Depending on the propagation conditions between the transmitter and receiver, the frequency of the variations of the radio channel may depend more on the relative speed between nodes rather than on the absolute speeds of the nodes. In an idealized propagation environment (Clarke model) where the nodes are not in reciprocal visibility, and where many local scatterers are randomly distributed surrounding the transmitter and the receiver, respectively, the channel can be modeled as a stochastic process whose time correlation depends on the carrier frequency and the absolute speeds of the transmitter and receiver. In the frequency domain, this corresponds to Doppler shifts and Doppler spreads.

In addition to the impairments introduced by the channel, there may be some misalignment (i.e., offset) between the frequency of the local oscillator used by the transmitter and the one used by the receiver. This may be caused, for example, by inaccuracies in the process of synchronization, by the non-ideal behavior of the electronic components, or by other factors. This offset results in a frequency shift (i.e., offset) between the baseband signals at the transmitter and the receiver. In many cases, the frequency shift can be assumed to be approximately constant within one subframe (i.e., it results in a linearly increasing phase shift in the time-domain signal at the receiver). The frequency shift distorts the received signal in such a way that the receiver experiences an equivalent channel given by the combination of the multipath physical channel and the frequency shift. Additional frequency impairments may contribute to the equivalent channel.

Figure 2:
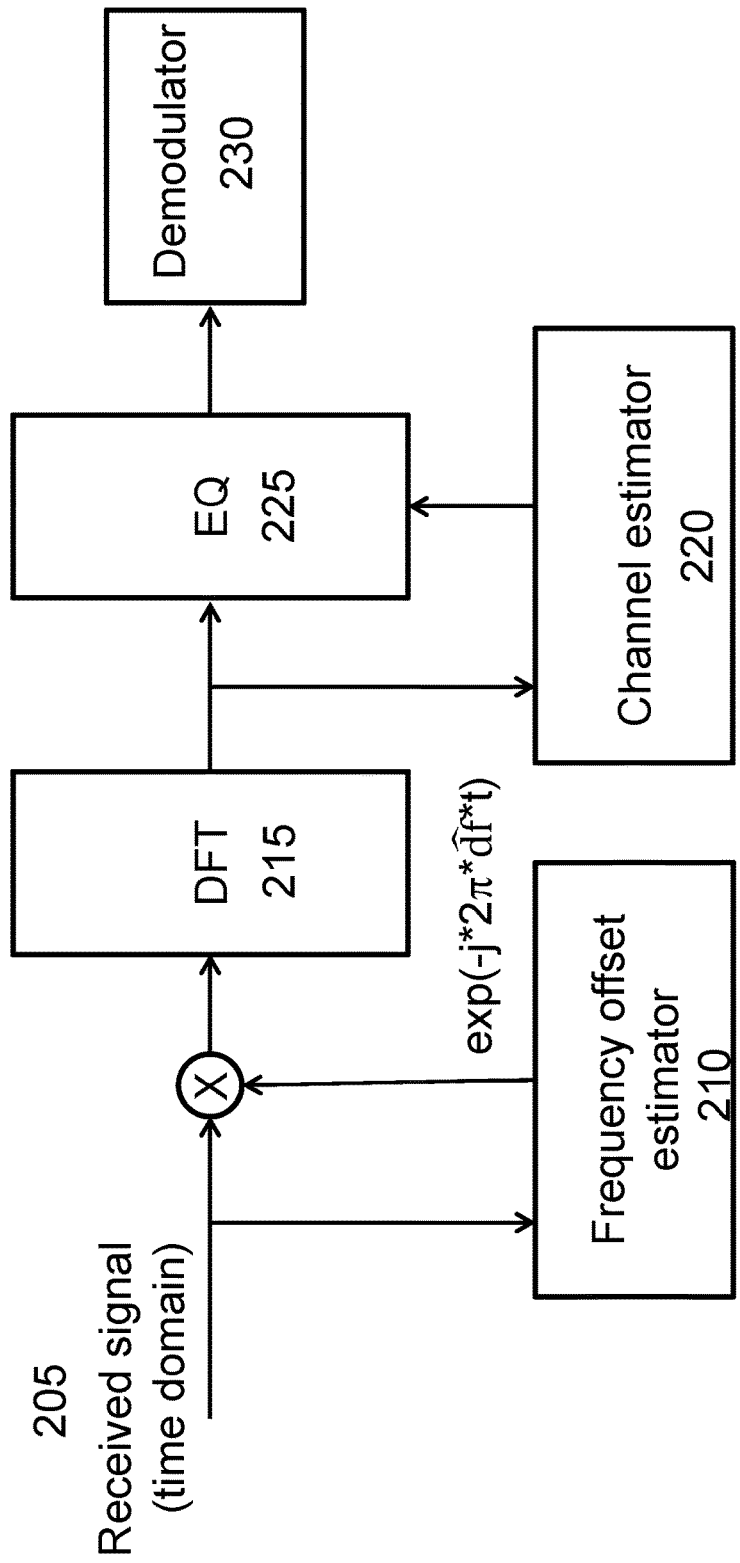
FIG. 2 illustrates a schematic diagram of a conventional channel estimation method.

FIG. 2 illustrates a schematic diagram of a conventional channel estimation method. More particularly, FIG. 2 illustrates a number of functional blocks at the receiver, including frequency offset estimator 210, discrete Fourier transform (DFT) 220, channel estimator 220, equalizer 225, and demodulator 230.

Generally, in the example of FIG. 2 a time-domain signal 205 is received at the receiver node. At frequency offset estimator 210, the frequency offset of received time-domain signal 205 is estimated. The estimated frequency offset is applied to received time-domain signal 205 and converted to a frequency-domain signal at DFT 215. The frequency-domain signal is passed to channel estimator 220. The channel estimation by channel estimator 220 is used to equalize the frequency-domain signal at equalizer 225. The equalized frequency-domain signal is then passed on to demodulator 230.

In the convention channel estimation method of FIG. 2, the discrete-time equivalent channel is modeled at the receiver corresponding to the $k^{th}$ symbol as:

$$h_k[n]*\exp(j*2\pi*df_{u,v}*(n*T_{sample}+k*T_s)),$$

where: $df_{u,v}$ is the frequency offset for transmitter u and receiver v; $T_{sample}$ is the sample time; and $T_s$ is the duration of an Orthogonal Frequency Division Multiplexing (OFDM) symbol. When the variations within an OFDM symbol due to the frequency offset are small, the channel response can be approximated as:

$$h_k[n]*\exp(j*2\pi*df_{u,v}*k*T_s).$$

At the receiver, the effects of channel distortion are usually compensated by means of channel equalization. This operation consists of a first channel estimation step in order to determine the equalization filter. Equalization may be implemented jointly with demodulation or other stages of the receiver. In the conventional approach of FIG. 2, which has been applied in cellular communication, the frequency offset between transmitter and receiver is estimated and compensated for in the time-domain signal at the receiver (e.g., by obtaining an estimate $\hat{df}_{u,v}$ of the frequency offset and multiplying the received signal by $\exp(-j*2\pi*\hat{df}_{u,v}*t)$ before the transformation (e.g., DFT) is applied at the receiver.

In the V2V case, however, multiple transmitters contribute to a single received subframe by use of frequency division multiple access (FDMA). Unlike FDMA used in cellular communication, in the V2V case the transmitters may have different synchronization references resulting in different $df_{u,v}$. This implies that the receiver needs to estimate and compensate (i.e., equalize) each of the $df_{u,v}$ independently. If this is done in the time-domain signal before the DFT at the receiver, as shown in the example of FIG. 2, the receiver needs to perform a number of parallel DFT processes corresponding to the number of frequency multiplexed users, which is demanding in cost and complexity.

Figure 3:
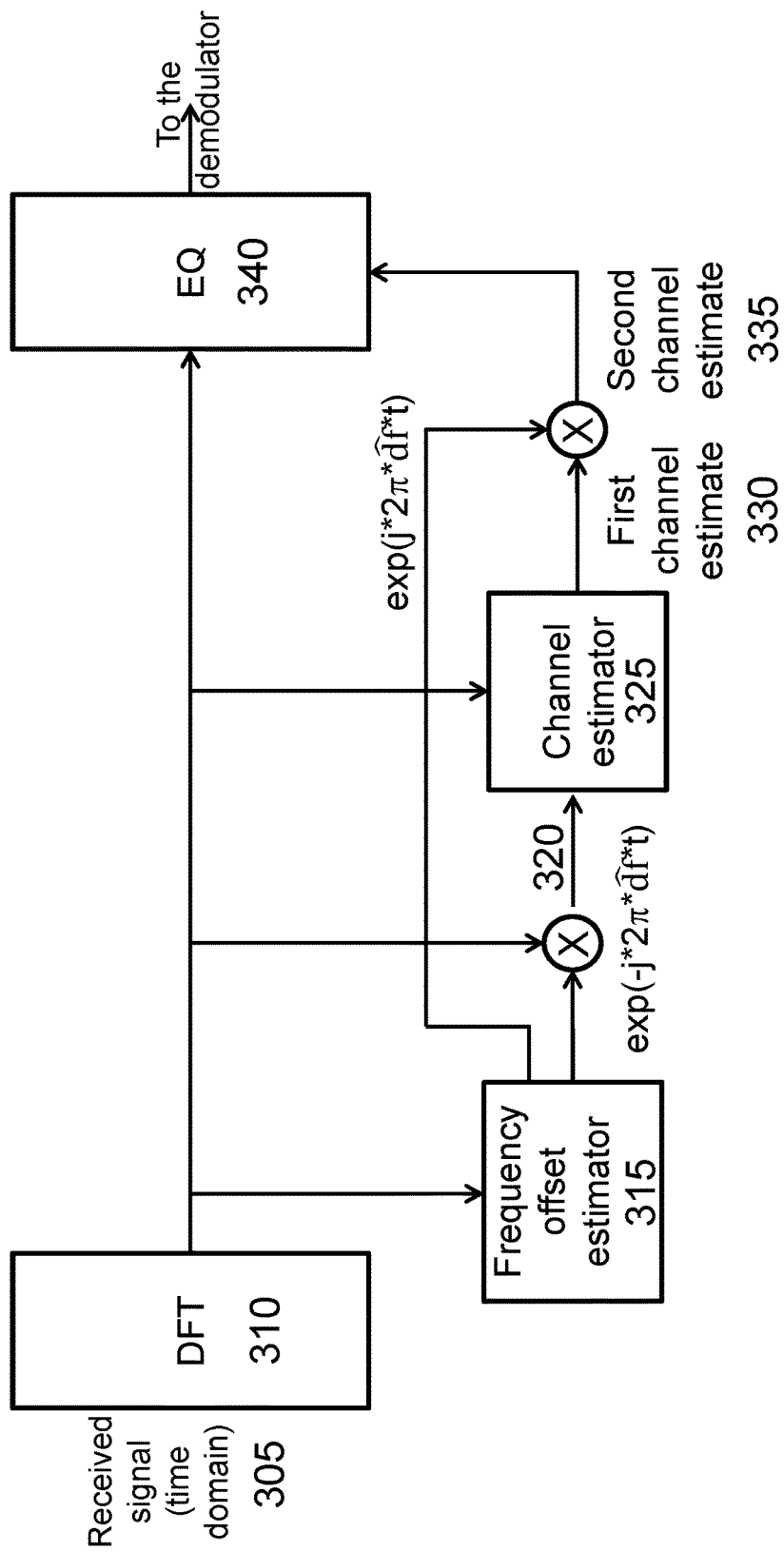
FIG. 3 illustrates a schematic diagram of an exemplary channel estimation algorithm, in accordance with certain embodiments.

FIG. 3 illustrates a schematic diagram of an exemplary channel estimation algorithm, in accordance with certain embodiments. The exemplary channel estimation algorithm of FIG. 3 includes a number of functional blocks at the receiver for implementing the channel estimation algorithm, including DFT 310, frequency offset estimator 315, channel estimator 325, and equalizer 345. In certain embodiments, the channel estimation algorithm of FIG. 3 may be applied to equalize the transmission of frequency multiplexed users without increasing the number of parallel DFTs required at the receiver. In certain embodiments, the channel estimation algorithm includes the following steps, which may be performed by a generic v-th receiver in the system.

At DFT 310, a received time-domain signal 305 is converted to a frequency-domain signal. Received time-domain signal 305 may be converted to a frequency-domain signal in any suitable manner. In the example embodiment of FIG. 3, received time-domain signal 305 is converted to the frequency-domain signal using a DFT:

$$Y[l] = DFT(y[n])$$

Although the example embodiment of FIG. 3 illustrates the use of a DFT to convert received time-domain signal 305, the present disclosure contemplates that other transformations may be used.

At frequency offset estimator 315, an estimate $\hat{df}_{u,v}$ of the frequency offset $df_{u,v}$ between each transmitter u of interest for a certain subframe and the v-th receiver is obtained. The estimated frequency offset may be obtained in any suitable manner. In some cases, the estimated frequency offset may be equivalently calculated with respect to any signal to which the transmitter is synchronized.

A frequency compensated signal 320 is obtained by compensating for the estimated frequency offset $\hat{df}_{u,v}$, at least for the fraction of the signal bandwidth that is transmitted by user u. In the example of FIG. 3, frequency compensated signal 320 is obtained by applying a first frequency offset to compensate for the estimated frequency offset, which is shown in FIG. 3 by multiplying the frequency-domain signal Y[l] and the first frequency offset $\exp(-j*2\pi*\hat{df}_{u,v}*t)$. This can be implemented, for example, by compensating the estimated frequency offset $\hat{df}_{u,v}$ only for the subcarriers used for transmission by user u. In some cases, the frequency shift compensation may span several OFDM symbols (e.g., belonging to a given subframe). A single value of $\hat{df}_{u,v}$ may be applied to the whole subframe or to a subset of symbols in the subframe. For example:

$$\tilde{Y}[l] = Y[l]*\exp(-j*2\pi*\hat{df}_{u,v}*t)$$

At channel estimator 325, a first channel estimation $\hat{H}[l]$ 330 is obtained from the frequency compensated signal $\tilde{Y}[l]$, at least for the subcarriers and symbols used by user u for transmission to v.

A second channel estimation $\hat{\hat{H}}[l]$ 335 is obtained from the first channel estimation $\hat{H}[l]$ by applying a second frequency offset to the estimated channel, which is shown in FIG. 3 by multiplying first channel estimation $\hat{H}[l]$ 330 and the second frequency offset $\exp(j*2\pi*\hat{df}_{u,v}*t)$. The second frequency offset is the opposite of the first frequency offset. By applying the opposite frequency offset $\hat{df}_{u,v}$ to the estimated channel, the frequency compensation applied to obtain frequency compensated signal 320 is offset). For example:

$$\hat{\hat{H}}[l] = \hat{H}[l]*\exp(j2\pi*\hat{df}_{u,v}*t)$$

In the example embodiment of FIG. 3, at equalizer 340 the second channel estimate $\hat{\hat{H}}[l]$ 335 is used to equalize the frequency-domain signal obtained at DFT 310. In certain embodiments, the equalized signal may be used to detect data transmitted by user u to receiver v. In some cases, the time variable t may be quantized, for example, according to the OFDM symbol duration ($t = k*T_s$).

The rationale of the channel estimation algorithm in the example embodiment of FIG. 3 is that conventional channel estimation algorithms perform better on channels that are not affected by a deterministic (within a subframe) linear phase shift. The channel estimation algorithm described in relation to FIG. 3 decouples channel estimation. By obtaining the frequency compensated signal as described above, the channel estimation algorithm "prepares" the signal by cancelling the deterministic phase shift, making it more suitable for channel estimation. Obtaining the second channel estimation $\hat{\hat{H}}[l]$ 340 compensates for the "preparation" step by adding back the deterministic phase shift by applying an opposite frequency offset.

Figure 4:
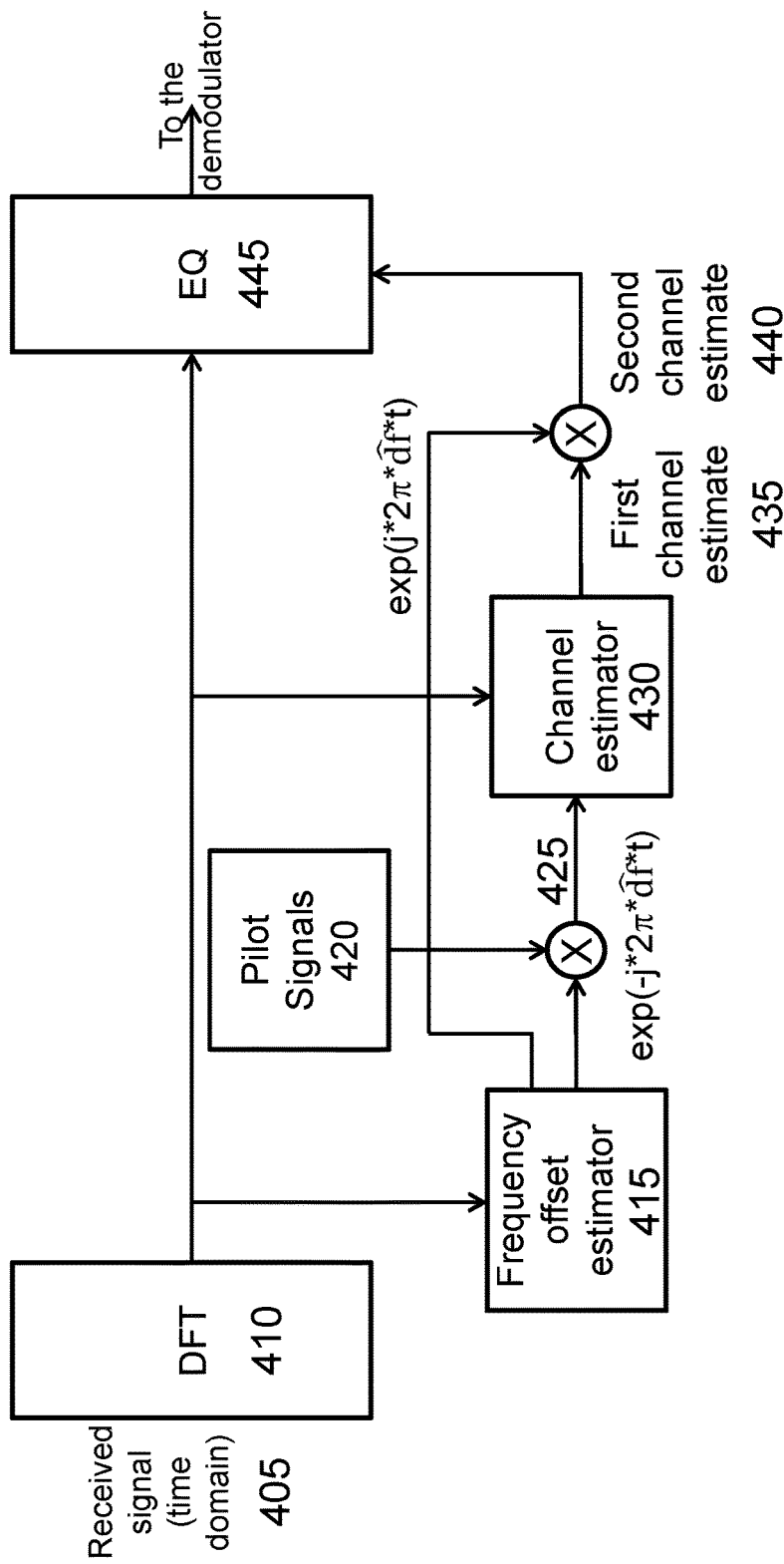
FIG. 4 illustrates a schematic diagram of another exemplary channel estimation algorithm, in accordance with certain embodiments.

FIG. 4 illustrates a schematic diagram of another exemplary channel estimation algorithm, in accordance with certain embodiments. The equivalent effect of the channel estimation algorithm described above with respect to FIG. 3 may be obtained using the alternative channel estimation algorithm illustrated in FIG. 4. The channel estimation algorithm of FIG. 4 includes a number of functional blocks at the receiver, including DFT 410, frequency offset estimator 415, pilot signals 420, channel estimator 430, and equalizer 445. In certain embodiments, the alternative channel estimation algorithm includes the following steps, which may be performed by a generic v-th receiver in the system.

Similar to the embodiment described above with respect to FIG. 3, at DFT 410 a received time-domain signal 405 is converted to a frequency-domain signal. Received time-domain signal 405 may be converted to the frequency-domain signal in any suitable manner. In the example embodiment of FIG. 4, received time-domain signal 405 is converted to the frequency-domain signal using a DFT, where:

$$Y[l] = DFT(y[n])$$

Although the example embodiment of FIG. 4 illustrates the use of a DFT to convert received time-domain signal 405 to the frequency-domain signal, the present disclosure contemplates that other transformations may be used.

At frequency offset estimator 415, an estimate $\hat{df}_{u,v}$ of the frequency offset $df_{u,v}$ between each transmitter u of interest for a certain subframe and the v-th receiver is obtained. The estimated frequency offset may be obtained in any suitable manner. In some cases, the estimated frequency offset may be equivalently calculated with respect to any signal to which the transmitter is synchronized to.

In the example embodiment of FIG. 4, pilot signal 420 is used to obtain a frequency compensated pilot signal 425. Frequency compensated pilot signal 425 is obtained by applying a first frequency offset to pilot signal 420 to compensate for the estimated frequency offset $\hat{df}_{u,v}$, at least for the fraction of the signal bandwidth that is transmitted by user u. This is shown in FIG. 4 by multiplying pilot signal 420 and the first frequency offset $\exp(-j*2\pi*\hat{df}_{u,v}*t)$. This can be implemented, for example, by compensating the estimated frequency offset $\hat{df}_{u,v}$ only for the subcarriers used for transmission by user u. The frequency shift compensation may span several pilot symbols (e.g., belonging to a given subframe). A single value of $\hat{df}_{u,v}$ may be applied to the whole subframe or to a subset of pilot symbols in the subframe. For example, if P[l] denotes the sequence of pilot symbols in the frequency domain:

$$\tilde{P}[l] = P[l]*\exp(-j*2\pi*\hat{df}_{u,v}*t)$$

At channel estimator 430, a first channel estimation $\hat{H}[l]$ 435 is obtained from frequency compensated pilot signal $\tilde{P}[l]$ 425, at least for the subcarriers and symbols used by user u for transmission to v.

A second channel estimation $\hat{H}[l]$ 440 is obtained from the first channel estimation $\hat{H}[l]$ 435 by applying a second frequency offset to the estimated channel, which is shown in FIG. 4 by multiplying the first channel estimation $\hat{H}[l]$ 435 by the second frequency offset $\exp(j*2\pi*\hat{df}_{u,v}*t$. The second frequency offset is the opposite of the first frequency offset. Applying the opposite frequency offset $\hat{df}_{u,v}$ to the estimated channel offsets the frequency compensation applied to pilot signal 420. For example:

$$\hat{H}[l]=\hat{H}[l]*\exp(j*2\pi*\hat{df}_{u,v}*t)$$

In the example embodiment of FIG. 4, at equalizer 445 the second channel estimate $\hat{H}[l]$ 440 is used to equalize the frequency-domain signal obtained at DFT 410. In certain embodiments, the equalized signal may be used to detect data transmitted by user u to receiver v.

Figure 5:
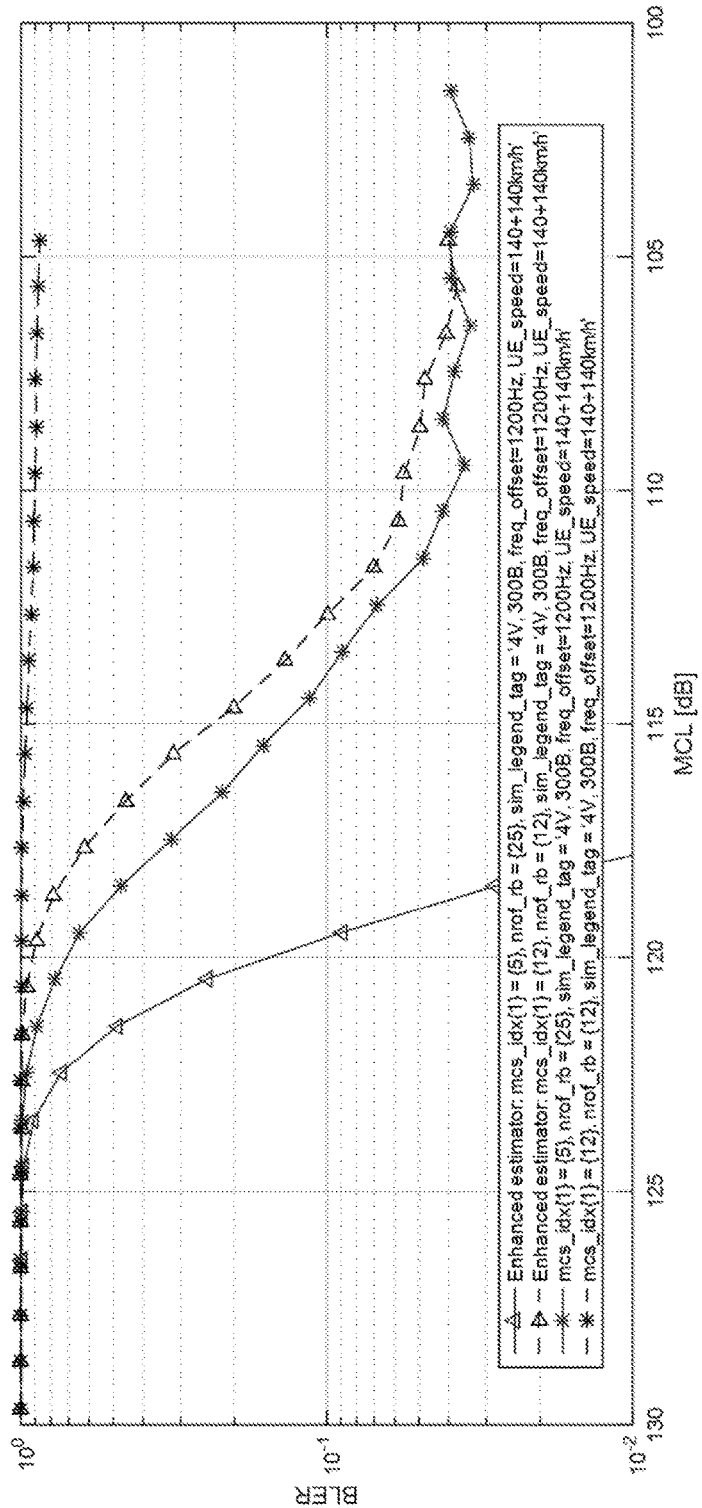
FIG. 5 illustrates demodulation performance with the proposed channel estimator, in accordance with certain embodiments.

FIG. 5 illustrates demodulation performance with the proposed channel estimator, in accordance with certain embodiments. More specifically, FIG. 5 illustrates demodulation performance with the proposed channel estimator for a 300 bytes packet at a carrier frequency of 6 GHz. In FIG. 5, it is assumed that the transmitter and receiver move at 140 km/h each in a rich scattering environment. The block error rate (BLER) is shown on the y-axis, and the minimum coupling loss (MCL) in dB is shown on the x-axis. In the example of demodulation performance in FIG. 5, the transmitter and receiver's oscillators have a 0.2 ppm misalignment. As used in FIG. 5, "nrof_rb" indicates the number of resource blocks (RBs) of 180 kHz each used for transmitting data in one subframe. The value "mcs_idx" indicates the modulation and coding scheme (MCS) used according to supported LTE MCS values. Four DMRS symbols/subframe are used in all simulations.

From FIG. 5, it can be see that the enhanced channel estimator algorithm described herein greatly improve performance compared to conventional channel estimation algorithms based on time-domain interpolation and extrapolation. Numerical simulations show that the channel estimation algorithms proposed herein enable significantly improved performance in some of the propagation scenarios where conventional techniques fail. This results in increased link and system performance, as well as a reduced need for DMRS densification, which in turn benefits signaling overhead.

Figure 6:
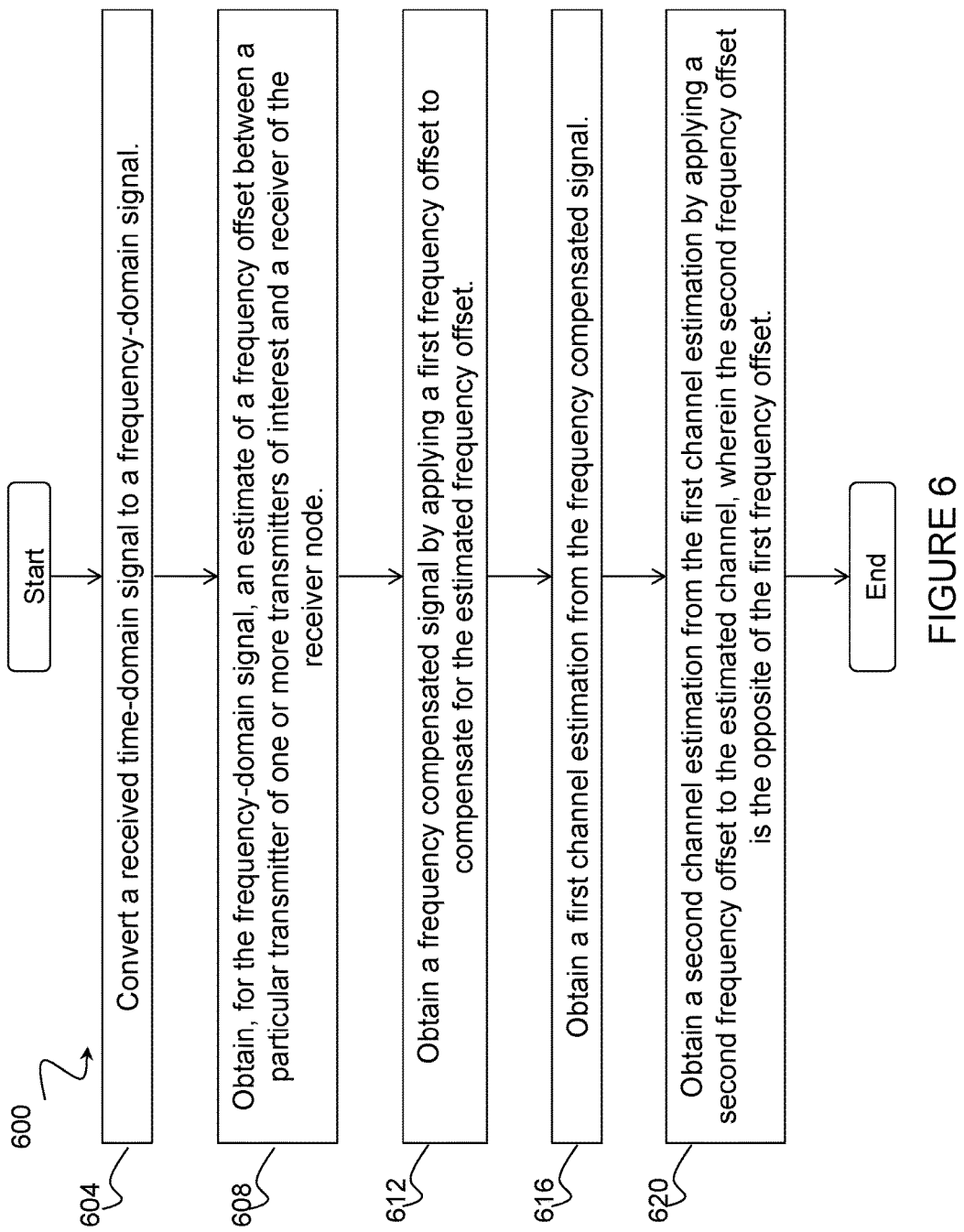
FIG. 6 is a flow diagram of a method in a receiver, in accordance with certain embodiments.

FIG. 6 is a flow diagram of a method in a receiver node, in accordance with certain embodiments. At step 604, the receiver node converts a received time-domain signal to a frequency-domain signal. In certain embodiments, the received time-domain signal may comprise a device-to-device communication. In certain embodiments, the received time-domain signal may be converted to a frequency-domain signal using a discrete Fourier transform.

At step 608, the receiver node obtains, for the frequency-domain signal, an estimate of a frequency offset between a particular transmitter of one or more transmitters of interest and a receiver of the receiver node. In certain embodiments, obtaining the estimate of the frequency offset between the particular transmitter and the receiver of the receiver node may comprise calculating an estimate of the frequency offset with respect to a signal to which the particular transmitter is synchronized.

At step 612, the receiver node obtains a frequency compensated signal by applying a first frequency offset to compensate for the estimated frequency offset. In certain embodiments, the frequency compensated signal may be obtained for at least a fraction of a signal bandwidth used by the particular transmitter. In certain embodiments, obtaining the frequency compensated signal by applying the first frequency offset to compensate for the estimated frequency offset may comprise applying the first frequency offset to the frequency domain signal to obtain the frequency compensated signal. In certain embodiments, the frequency compensated signal may comprise a frequency compensated pilot signal, and obtaining the frequency compensated signal by applying the first frequency offset to compensate for the estimated frequency offset may comprise applying the first frequency offset to a pilot signal to obtain the frequency compensated pilot signal.

At step 616, the receiver node obtains a first channel estimation from the frequency compensated signal. In certain embodiments, the first channel estimation may be obtained for at least one or more subcarriers and symbols used by the particular transmitter for transmission to the receiver node. In certain embodiments, obtaining the first channel estimation from the frequency compensated signal may comprise obtaining the first channel estimation from the frequency compensated pilot signal.

At step 620, the receiver node obtains a second channel estimation from the first channel estimation by applying a second frequency offset to the estimated channel, wherein the second frequency offset is the opposite of the first frequency offset.

In certain embodiments, the method may comprise equalizing the frequency-domain signal using the second channel estimation. The method may comprise detecting data transmitted to the receiver node using the equalized frequency-domain signal.

Figure 7:
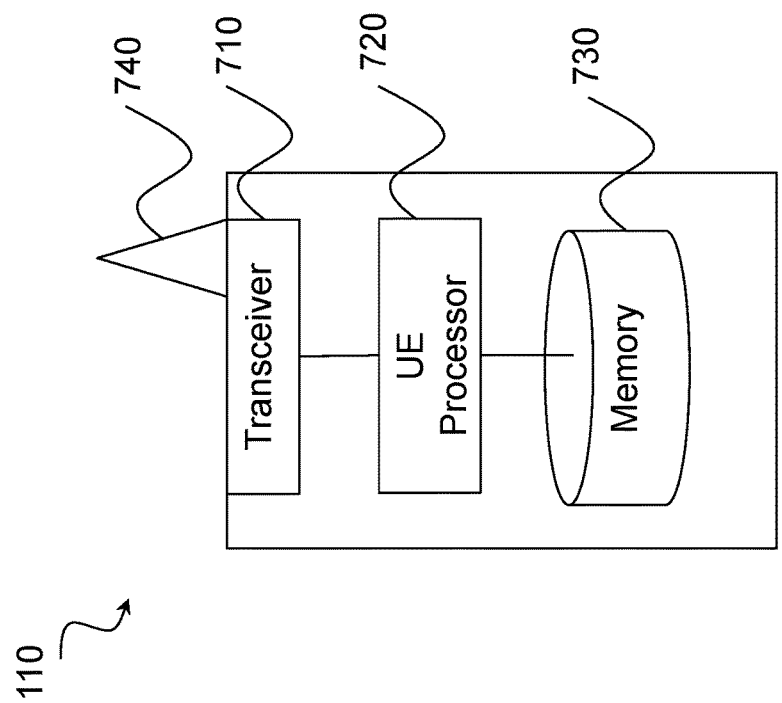
FIG. 7 is a block schematic of an exemplary wireless device, in accordance with certain embodiments.

FIG. 7 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processor 720, and memory 730. In some embodiments, transceiver 710 facilitates transmitting wireless signals to and receiving wireless signals from network node 115 (e.g., via antenna 740), processor 720 executes instructions to provide some or all of the functionality described above as being provided by wireless device 110, and memory 730 stores the instructions executed by processor 720.

Processor 720 may include any suitable combination of hardware and software implemented in one or more modules to execute instructions and manipulate data to perform some or all of the described functions of wireless device 110, such as the functions of wireless device 110 described above in relation to FIGS. 1-6. In some embodiments, processor 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 720. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
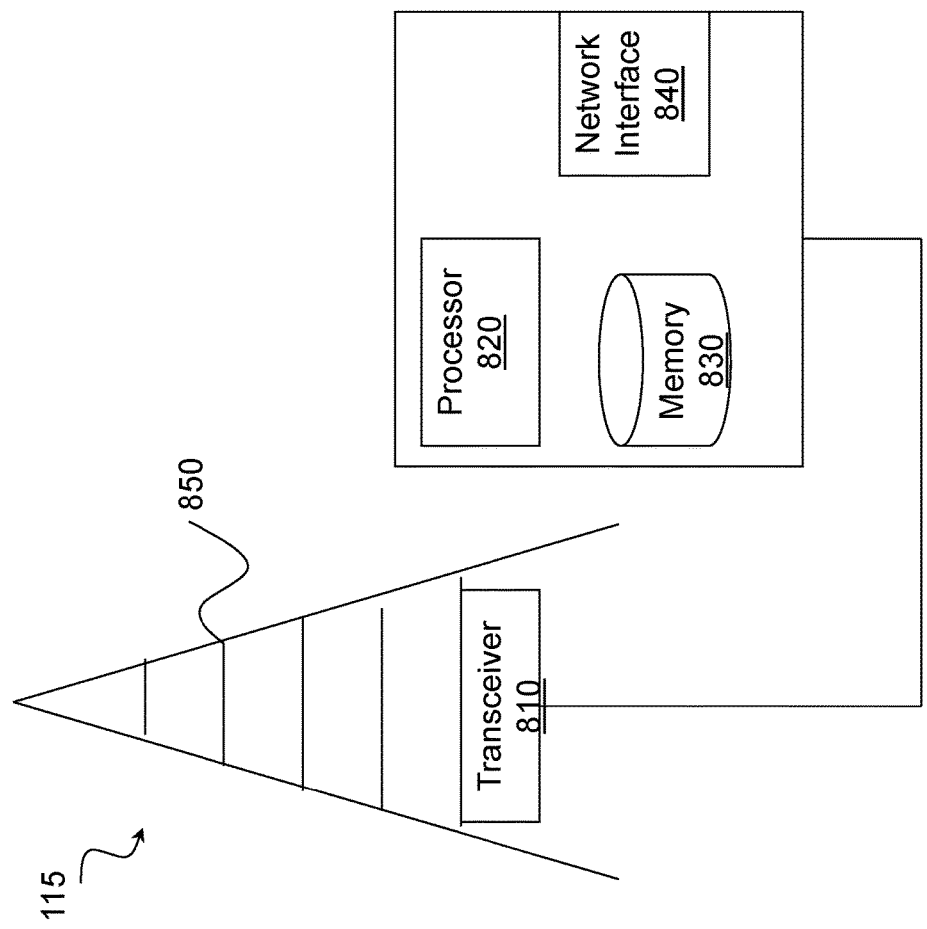
FIG. 8 is a block schematic of an exemplary network node, in accordance with certain embodiments.

FIG. 8 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processor 820, memory 830, and network interface 840. In some embodiments, transceiver 810 facilitates transmitting wireless signals to and receiving wireless signals from wireless device 110 (e.g., via antenna 850), processor 820 executes instructions to provide some or all of the functionality described above as being provided by a network node 115, memory 830 stores the instructions executed by processor 820, and network interface 840 communicates signals to backend network components, such as a gateway, switch, router, Internet, Public Switched Telephone Network (PSTN), core network nodes or radio network controllers 130, etc.

Processor 820 may include any suitable combination of hardware and software implemented in one or more modules to execute instructions and manipulate data to perform some or all of the described functions of network node 115, such as those described above in relation to FIGS. 1-6 above. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
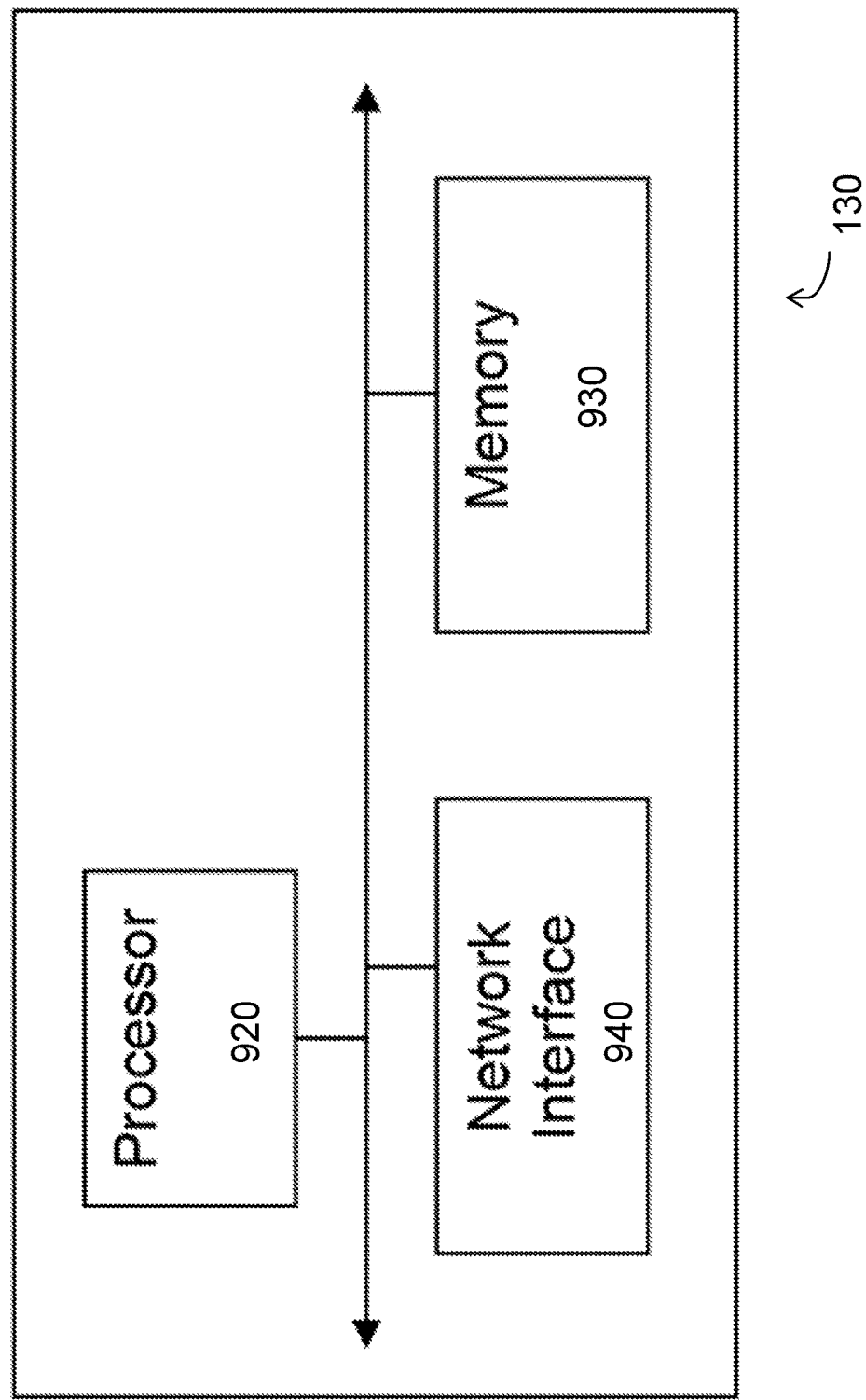
FIG. 9 is a block schematic of an exemplary radio network controller or core network node, in accordance with certain embodiments.

FIG. 9 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes 130, etc.

Processor 920 may include any suitable combination of hardware and software implemented in one or more modules to execute instructions and manipulate data to perform some or all of the described functions of the radio network controller or core network node 130. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Figure 10:
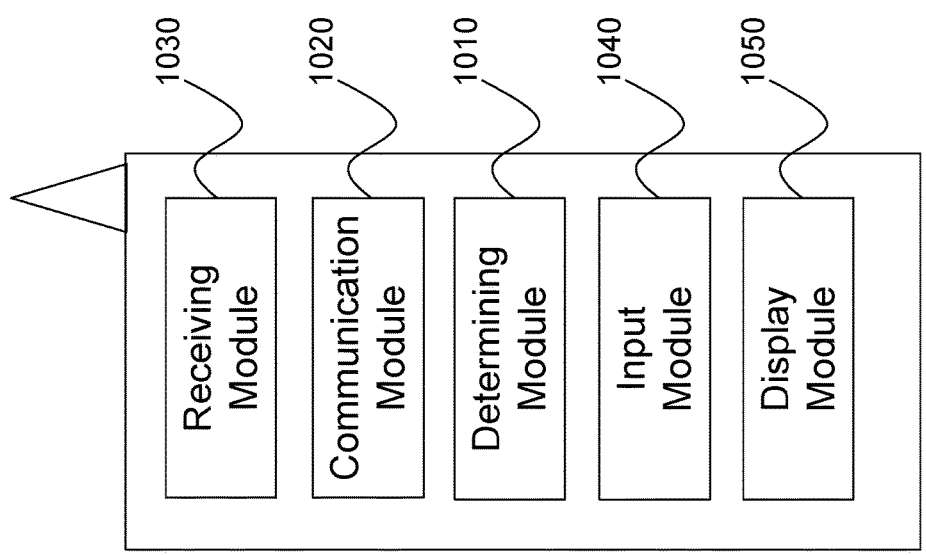
FIG. 10 is a block schematic of an exemplary wireless device, in accordance with certain embodiments.

FIG. 10 is a block schematic of an exemplary wireless device, in accordance with certain embodiments. Wireless device 110 may include one or more modules. For example, wireless device 110 may include a determining module 1010, a communication module 1320, a receiving module 1030, an input module 1040, a display module 1050, and any other suitable modules. In some embodiments, one or more of determining module 1010, communication module 1020, receiving module 1030, or any other suitable module may be implemented using one or more processors, such as processor 720 described above in relation to FIG. 7. Wireless device 110 may perform the methods for robust channel estimation for vehicular applications described above with respect to FIGS. 1-6.

Determining module 1010 may perform the processing functions of wireless device 110. For example, in certain embodiments wireless device 110 may perform the functions of the receiver node described above in relation to FIGS. 1-6. In such a case, determining module 1010 may convert a received time-domain signal to a frequency-domain signal. Determining module 1010 may obtain, for the frequency-domain signal, an estimate of a frequency offset between a particular transmitter of one or more transmitters of interest and a receiver of the receiver node. Determining module 1010 may obtain a frequency compensated signal by applying a first frequency offset to compensate for the estimated frequency offset. Determining module 1010 may obtain a first channel estimation from the frequency compensated signal. Determining module 1010 may obtain a second channel estimation from the first channel estimation by applying a second frequency offset to the estimated channel, wherein the second frequency offset is the opposite of the first frequency offset. Determining module 1010 may equalize the frequency-domain signal using the second channel estimation. Determining module 1010 may detect data transmitted to the receiver node using the equalized frequency-domain signal.

Determining module 1010 may include or be included in one or more processors, such as processor 720 described above in relation to FIG. 7. Determining module 1010 may include analog and/or digital circuitry configured to perform any of the functions of determining module 1010 and/or processor 720 described above. The functions of determining module 1010 described above may, in certain embodiments, be performed in one or more distinct modules.

Communication module 1020 may perform the transmission functions of wireless device 110. Communication module 1020 may transmit messages to one or more of network nodes 115 of network 100. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010. In certain embodiments, the functions of communication module 1020 described above may be performed in one or more distinct modules.

Receiving module 1030 may perform the receiving functions of wireless device 110. As one example, receiving module 1030 may receive a time-domain signal. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010. In certain embodiments, the functions of receiving module 1030 described above may be performed in one or more distinct modules.

Input module 1040 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010.

Display module 1050 may present signals on a display of wireless device 110. Display module 1050 may include the display and/or any appropriate circuitry and hardware configured to present signals on the display. Display module 1050 may receive signals to present on the display from determining module 1010.

Determining module 1010, communication module 1020, receiving module 1030, input module 1040, and display module 1050 may include any suitable configuration of hardware and/or software. Wireless device 110 may include additional modules beyond those shown in FIG. 10 that may be responsible for providing any suitable functionality, including any of the functionality described above and/or any additional functionality (including any functionality necessary to support the various solutions described herein).

FIG. 11 is a block schematic of an exemplary network node 115, in accordance with certain embodiments. Network node 115 may include one or more modules. For example, network node 115 may include determining module 1110, communication module 1120, receiving module 1130, and any other suitable modules. In some embodiments, one or more of determining module 1110, communication module 1120, receiving module 1130, or any other suitable module may be implemented using one or more processors, such as processor 820 described above in relation to FIG. 8. In certain embodiments, the functions of two or more of the various modules may be combined into a single module. Network node 115 may perform the methods for robust channel estimation for vehicular applications described above with respect to FIGS. 1-6.

Determining module 1110 may perform the processing functions of network node 115. For example, in certain embodiments network node 115 may perform the functions of the receiver node described above in relation to FIGS. 1-6. In such a case, determining module 1110 may convert a received time-domain signal to a frequency-domain signal. Determining module 1110 may obtain, for the frequency-domain signal, an estimate of a frequency offset between a particular transmitter of one or more transmitters of interest and a receiver of the receiver node. Determining module 1110 may obtain a frequency compensated signal by applying a first frequency offset to compensate for the estimated frequency offset. Determining module 1110 may obtain a first channel estimation from the frequency compensated signal. Determining module 1110 may obtain a second channel estimation from the first channel estimation by applying a second frequency offset to the estimated channel, wherein the second frequency offset is the opposite of the first frequency offset. Determining module 1010 may equalize the frequency-domain signal using the second channel estimation. Determining module 1010 may detect data transmitted to the receiver node using the equalized frequency-domain signal.

Determining module 1110 may include or be included in one or more processors, such as processor 820 described above in relation to FIG. 8. Determining module 1110 may include analog and/or digital circuitry configured to perform any of the functions of determining module 1110 and/or processor 820 described above. The functions of determining module 1110 may, in certain embodiments, be performed in one or more distinct modules.

Communication module 1120 may perform the transmission functions of network node 115. Communication module 1120 may transmit messages to one or more of wireless devices 110. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110 or any other module. The functions of communication module 1120 may, in certain embodiments, be performed in one or more distinct modules.

Receiving module 1130 may perform the receiving functions of network node 115. For example, receiving module 1130 may receive a time-domain signal. Receiving module 1130 may receive any suitable information from a wireless device. Receiving module 1130 may include a receiver and/or a transceiver, such as transceiver 810 described above in relation to FIG. 8. Receiving module 1130 may include circuitry configured to wirelessly receive messages and/or signals. In particular embodiments, receiving module 1130 may communicate received messages and/or signals to determining module 1110 or any other suitable module. The functions of receiving module 1130 may, in certain embodiments, be performed in one or more distinct modules.

Determining module 1110, communication module 1120, and receiving module 1130 may include any suitable configuration of hardware and/or software. Network node 115 may include additional modules beyond those shown in FIG. 11 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3G Third Generation of Mobile Telecommunications Technology
3GPP 3rd Generation Partnership Project
AP Access Point
BS Base Station
BSC Base Station Controller
BSM Basic Safety Message
BTS Base Transceiver Station
BW Bandwidth
CAM Cooperative Awareness Message
CPE Customer Premises Equipment
D2D Device-to-device
DAS Distributed Antenna System
DENM Decentralized Environmental Notification Message
DFT Discrete Fourier Transform
DL Downlink
DMRS Demodulation Reference Signal
DPTF Data Packet Transmission Format
DSRC Dedicated Short-Range Communications
eNB evolved Node B
EPDCCH Enhanced Physical Downlink Control Channel
ETSI European Telecommunications Standards Institute
FDD Frequency Division Duplex
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MSR Multi-standard Radio
NAS Non-Access Stratum
OFDM Orthogonal Frequency Division Multiplexing
PDCCH Physical Downlink Control Channel
PDSCH Physical Downlink Shared Channel
PSTN Public Switched Telephone Network
PUSCH Physical Uplink Shared Channel
PUCCH Physical Uplink Control Channel RB Resource Block
RNC Radio Network Controller
RRC Radio Resource Control
RRH Remote Radio Head
RRU Remote Radio Unit
RS Reference Signal
RSU Roadside Unit
SAE Society of the Automotive Engineers
STA Station
TDD Time Division Duplex
TF Transport Format
UE User Equipment
UL Uplink
V2I Vehicle-to-Infrastructure
V2P Vehicle-to-Pedestrian
V2V Vehicle-to-vehicle communication
V2x Vehicle-to-anything-you-can-imagine
WAN Wide Area Network

The invention claimed is:

1. A method in a receiver node, the method comprising:
converting a received time-domain signal to a frequency-domain signal;
obtaining, for the frequency-domain signal, an estimate of a frequency offset between a particular transmitter of one or more transmitters of interest and a receiver of the receiver node;
obtaining a frequency compensated signal by applying a first frequency offset to compensate for the estimated frequency offset, wherein the frequency compensated signal comprises a frequency compensated pilot signal, and wherein obtaining the frequency compensated signal by applying the first frequency offset to compensate for the estimated frequency offset comprises applying the first frequency offset to a pilot signal to obtain the frequency compensated pilot signal;
obtaining a first channel estimation from the frequency compensated signal; and
obtaining a second channel estimation from the first channel estimation by applying a second frequency offset to the first channel estimation, wherein the second frequency offset is the opposite of the first frequency offset.

2. The method of claim 1, further comprising equalizing the frequency-domain signal using the second channel estimation.

3. The method of claim 2, further comprising detecting data transmitted to the receiver node using the equalized frequency-domain signal.

4. The method of claim 1, wherein the received time-domain signal is converted to the frequency-domain signal using a discrete Fourier transform.

5. The method of claim 1, wherein obtaining the estimate of the frequency offset between the particular transmitter and the receiver of the receiver node comprises:
calculating an estimate of the frequency offset with respect to a signal to which the particular transmitter is synchronized.

6. The method of claim 1, wherein the frequency compensated signal is obtained for at least a fraction of a signal bandwidth used by the particular transmitter.

7. The method of claim 1, wherein obtaining the frequency compensated signal by applying the first frequency offset to compensate for the estimated frequency offset further comprises:
applying the first frequency offset to the frequency-domain signal to obtain the frequency compensated signal.

8. The method of claim 1, wherein obtaining the first channel estimation from the frequency compensated signal comprises obtaining the first channel estimation from the frequency compensated pilot signal.

9. The method of claim 1, wherein the first channel estimation is obtained for at least one or more subcarriers and symbols used by the particular transmitter for transmission to the receiver node.

10. The method of claim 1, wherein the received time-domain signal comprises a device-to-device communication signal.

11. The method of claim 1, wherein the receiver node comprises one of a network node and a wireless device.

12. A receiver node, comprising:
a receiver; and
one or more processors coupled to the receiver, wherein the one or more processors are configured to:
convert a received time-domain signal to a frequency-domain signal;
obtain, for the frequency-domain signal, an estimate of a frequency offset between a particular transmitter of one or more transmitters of interest and a receiver of the receiver node;
obtain a frequency compensated signal by applying a first frequency offset to compensate for the estimated frequency offset, wherein the frequency compensated signal comprises a frequency compensated pilot signal, and wherein, to obtain the frequency compensated signal by applying the first frequency offset to compensate for the estimated frequency offset, the one or more processors are configured to apply the first frequency offset to a pilot signal to obtain the frequency compensated pilot signal;
obtain a first channel estimation from the frequency compensated signal; and
obtain a second channel estimation from the first channel estimation by applying a second frequency offset to the first channel estimation, wherein the second frequency offset is the opposite of the first frequency offset.

13. The receiver node of claim 12, wherein the one or more processors are further configured to equalize the frequency-domain signal using the second channel estimation.

14. The receiver node of claim 13, wherein the one or more processors are further configured to detect data transmitted to the receiver node using the equalized frequency-domain signal.

15. The receiver node of claim 12, wherein the received time-domain signal is converted to the frequency-domain signal using a discrete Fourier transform.

16. The receiver node of claim 12, wherein, to obtain the estimate of the frequency offset between the particular transmitter and the receiver of the receiver node, the one or more processors are configured to:
calculate an estimate of the frequency offset with respect to a signal to which the particular transmitter is synchronized.

17. The receiver node of claim 12, wherein the frequency compensated signal is obtained for at least a fraction of a signal bandwidth used by the particular transmitter.

18. The receiver node of claim 12, wherein, to obtain the frequency compensated signal by applying the first frequency offset to compensate for the estimated frequency offset, the one or more processors are further configured to:
apply the first frequency offset to the frequency-domain signal to obtain the frequency compensated signal.

19. The receiver node of claim 12, wherein, to obtain the first channel estimation from the frequency compensated signal, the one or more processors are configured to obtain the first channel estimation from the frequency compensated pilot signal.

20. The receiver node of claim 12, wherein the first channel estimation is obtained for at least one or more subcarriers and symbols used by the particular transmitter for transmission to the receiver node.

21. The receiver node of claim 12, wherein the received time-domain signal comprises a device-to-device communication signal.

22. The receiver node of claim 12, wherein the receiver node comprises one of a network node and a wireless device.

\* \* \* \* \*